Patented Nov. 2, 1937

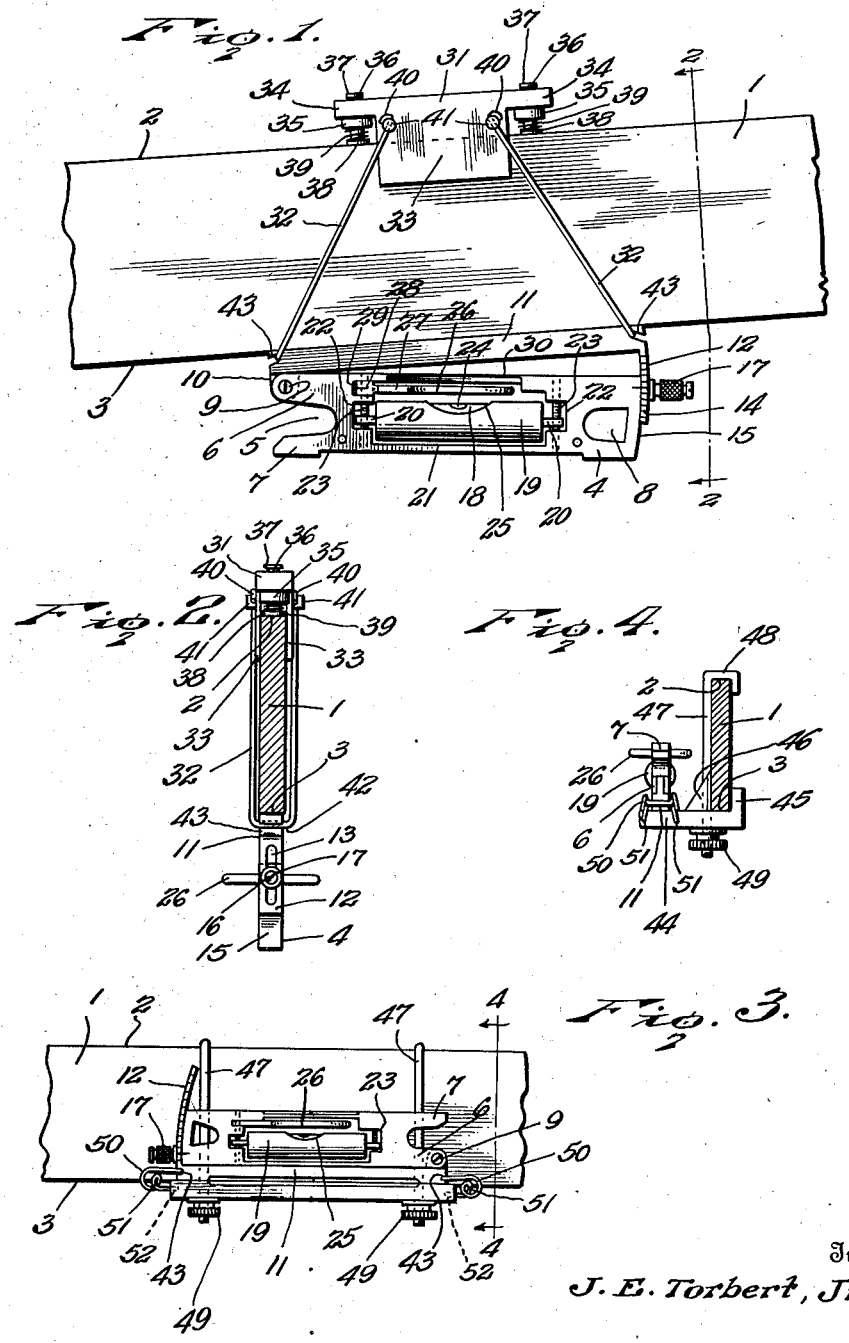

2,097,848

UNITED STATES PATENT OFFICE 2,097,848

LEVEL AND SUPPORT THEREFOR

John E. Torbert, Jr., National City, Calif.

Original application September 16, 1935, Serial No. 40,833. Divided and this application December 11, 1936, Serial No. 115,436

6 Claims. (Cl. 33—207)

This invention relates to a level and supporting means therefor, the present application constituting a division from the co-pending application for a Testing and setting device for artificial horizon instruments filed September 16, 1935, Serial No. 40,833.

One object of the invention is to provide a level and supporting means of such construction that the level may be detachably applied to a bar which is to be disposed in contacting and bridging relation to the leveling lug of an airplane fuselage or wings and the level firmly held in place against the bar while the level is being set to ascertain the angular relation of the fuselage or wings to a true horizontal plane.

It is another object of the invention to so construct the means for securing the level against the companion straight edge bar that it may be very easily applied to the bar and the level firmly held in place while at the same time allowing the level to be slid longitudinally of the bar to an adjusted position thereof if found necessary or desirable.

It is another object of the invention to provide level-securing means of such construction that it may be applied in straddling or encircling relation to the straight edge bar with the securing means bearing against one edge face of the bar and holding the level in flat contacting engagement with an opposite edge face of the bar.

Another object of the invention is to so construct the securing means for the level that, after the bar has been disposed in engagement with leveling lugs of an airplane and a level set, the level may be released and another applied without removing the securing means from the bar.

While it has been stated that the level and the bar to which it is secured is to be employed for ascertaining the angular relation of the fuselage or wings of an airplane to a true horizontal plane, it is obvious that it is not restricted to such use but may be used wherever it is desired to make use of a straight edge bar having a level detachably secured thereto.

The invention is illustrated in the accompanying drawing, wherein

Figure 1 is a view in side elevation showing a level secured against a straight edge bar by supporting means constructed in accordance with this invention, Figure 2 is a view taken along the line 2—2 of Figure 1, Figure 3 is a side elevation showing a level connected with a straight edge bar by supporting means of a modified construction, and Figure 4 is a view taken along the line 4—4 of Figure 3.

The straight edge bar 1 may be of any desired length, width and thickness and is formed with opposed straight edges 2 and 3. The level which is to be secured against one of the edge faces of the bar 1 has a body 4 formed of strong metal recessed from one end, as shown at 5, to provide arms 6 and 7 and adjacent its other end being formed with an opening 8. The opening 8 constitutes a convenient finger-hold whereby the body or plate may be easily grasped and the body swung about the screw 9 which serves as a pivot pin and pivotally connect the body with the ear 10 of the bar 11. An arcuate arm 12 which is slotted, as shown at 13 in Figure 2, and provided with scale markings 13 along one side edge face, as shown at 14, in Figure 1, extends from the bar 11 at the opposite end thereof from the ear 10 and has flat contacting engagement with the arcuate end face 15 of the body or plate 4, and in order that the body 4 of the level may be secured in a set position, there has been provided a threaded stem 16 extending from the arcuate end face 15 of the body through the slot 13 and carrying a threaded sleeve or nut 17 which, when tightened, has binding engagement with the outer side face of the arm 12 to securely but releasably hold the body or plate 4 in a set position.

The bubble glass 18 is enclosed in a cylindrical casing 19 formed of metal and from ends of this casing extend ears 20 having threaded openings formed therein. The bubble glass and its casing fit into and opening 21 formed through the plate or body 4 and the lugs or ears 20 extend into recesses 22 leading from ends of the opening 21 where they are engaged by threaded screws or pins 23 which pass through the threaded openings of the lugs, and it will be readily appreciated that by turning the pins the bubble glass and its casing may be tilted longitudinally to properly adjust it to a leveling position when the level is applied to a testing surface and the bubble glass and its casing initially set. When the level is used for overhead work, such as when applying the bar 1 to leveling lugs upon a wing of an airplane, the bubble 24 cannot be seen through the sight opening 25 of the tubular casing 19, and in order to permit observation of the bubble, there has been provided a mirror 26 having a shank 27 terminating in a mounting head or bearing 28. This bearing head fits about one of the pins 23 within a recess 29 formed in the body or plate 4 so that the mirror may be swung into and out of position between the bubble glass and the bar 30 of the body or plate 4, and attention is called to the fact that the bearing head 28 is pivoted to the shank 27 axially thereof in order that, when the mirror is in position for use, it may be tilted transversely of the bubble glass and thus permit a person standing upon the ground under the bar 1 to obtain a clear view of the reflection of the bubble in the mirror.

In order to securely but detachably hold the bubble against an edge face of the bar 1, there has been provided securing means which may be constructed either as shown in Figures 1 and 2 or as shown in Figures 3 and 4. In the embodiment illustrated in Figures 1 and 2, the securing means consist briefly of a block 31 applied to the straight edge bar 1 at the opposite sides thereof from the level and yokes 32 carried by the block and disposed in straddling relation to the straight edge bar for engaging end portions of the bar 11 of the level. The block 31 is formed of strong metal and is grooved to provide side plates 33 between which the straight edge bar fits snugly, as shown in Figure 2. The end portions of the block provide arms 34 formed with bosses 35 and through these bosses and the arms are drilled openings to slidably receive plungers 36. These plungers have heads 37 to limit their sliding movement through the arms in one direction and at their opposite ends are formed with heads 38 which bear against the edge face of the bar 1 and are engaged by springs 39 coiled about the plungers between the heads 38 and the bosses 35. It will thus be seen that, when the block is applied to the straight edge bar with the heads 38 bearing against the edge face 2 thereof, the springs will urge the block away from the bar and pull will be exerted upon the yokes 32. The yokes 32 are formed of wire strands bent to provide U-shaped yokes, as shown clearly in Figure 2, and at their ends the arms of the yokes are bent to form hooked ends 40 which prevent the arms of the yokes from becoming detached from the side lugs 41 of the block through which they are slidably engaged, as shown in Figure 1. The lugs 41 are in the form of pins which may be referred to as small rocker shafts and are journaled through the wings or plates 33 with their ends projecting from opposite sides of the block. By this arrangement the lugs or pins provide pivotal mountings for the yokes and the yokes may be swung longitudinally of the straight edge bar and the bridge portions 42 of the yoke engaged in the grooves or recesses 43 formed at ends of the bar 11 of the level. These grooves are cut diagonally, as clearly shown in Figure 1, and when the bridge portions of the yoke are engaged in the groove pull exerted by the springs 39 will firmly hold the yokes seated in the grooves and prevent them from accidentally slipping out of place.

When the level is in use, the block is disposed against the edge face 2 of the bar with the bar extending through the yokes. The level is then applied to the edge face 3 of the bar with its bar 11 in flat contacting engagement therewith and the block 31 pressed toward the edge face 2 so that the bridge portions of the yokes may be engaged in the notches 43. Pressure upon the block is then relieved so that the springs 39 can expand and urge the block away from straight edge bar to exert pull upon the yoke and thus hold the level in flat contacting engagement with the edge face 3 of the bar. The straight edge bar is then applied to the leveling lugs of an airplane fuselage or wings and by loosening the securing nut or sleeve 17 the body 4 of the level may be swung about its pivot 9 to such a position that the bubble 24 will be properly centered in the sight opening 25 of the casing 19. The fastener 17 will then be again tightened until it frictionally grips the outer face of the bar 12 and the body 4 of the level will be securely held in the set position. The level will thus accurately indicate the angular relation of the fuselage or wings of an airplane to a true horizontal plane and by pressing upon the block the yokes may be moved out of gripping engagement with the end portions of the bar 11 of the level and swung out of the grooves 43 to release the level and thus permit the level to be transferred to a support such as shown in the co-pending application previously referred to and used for checking an artificial horizon instrument of an airplane. It is to be understood that use of the level is not restricted to ascertaining the angular relation of an airplane fuselage or wings to a true horizontal plane and then checking an artificial horizon instrument as the straight edge bar with the level applied thereto may be used for ascertaining the angular relation of the plane of any two objects to a true horizontal plane when the objects are spaced from each other a distance which would prevent the use of a level of ordinary length and require that the level be applied to an elongated straight edge bar.

In Figures 3 and 4, the level is supported in operative relation to the straight edge bar by a modified form of supporting means. In this embodiment of the invention, the level is of the same construction previously described and corresponding parts are indicated by the same reference numerals. Instead of providing a block 31 and yokes 32, there has been provided a plate or bracket 44 having a rear flange 45 and upstanding lugs 46 spaced forwardly from the flange a sufficient distance to permit the bar 1 to fit snugly between the flange and the lugs. Bolts 47 having hooks 48 at their upper ends and having their lower end portions threaded are passed through openings formed in the plate or bracket 44 and securing nuts 49 are applied to these bolts under the bracket. The bolts extend vertically with their hooks 48 engaged over the edge face 2 of the straight edge bar 1 and the lower portion of the bar engaged between the flange 45 and the lug 46 and when the nuts 49 are tightened the bracket will be securely but detachably held in engagement with the straight edge bar at right angles thereto. The level rests upon the upper face of the bracket, as shown clearly in Figure 3, and in order to securely but detachably hold the level in place upon the bracket, there has been provided spring clips 50 which are formed from strands of resilient wire and are of a U-shaped construction. The arms of the clips are bent upon themselves to provide coiled springs 51 and ends of the arms are mounted in sockets 52 formed in end edges of the plate or bracket 44. The bridge portions of the clips overhang end portions of the bracket and when these bridge portions are engaged in the notches 43 at ends of the bar 11 of the level, the level will be firmly held in place upon the bracket but may be easily released for removal therefrom. Referring to Figure 4, it will be seen that, when the level is applied to this embodiment of the supporting means, it will be securely mounted and held in operative relation to the straight edge bar but will be disposed forwardly of the bar in parallel relation thereto instead of under the straight edge bar. A level after being set can be easily detached from the supporting bracket for transfer to another support for use in checking a horizontal horizon instrument and another elevel secured in place upon the bracket 44 so that after the angular relation of the fuselage to a true horizontal plane has been ascertained the angle at which the wings extend relative to a true horizontal plane may be determined.

Having thus described the invention, what is claimed as new is:

1. A straight edged bar of a length adapting it to be applied in spanning relation to spaced objects, a level applicable to a straight edge face of said bar and having notches at its ends, and means for detachably securing the level to the bar consisting of a yoke having a portion U-shaped in cross section and straddling the bar at the opposite side thereof from the level, plungers slidably carried by said yoke and yieldably held in position to bear against an edge face of the bar with the yoke urged away from the bar, and loops carried by said yoke to engage about the bar and through the notches in the ends of the level to securely but detachably hold the level in place.

2. A straight edged bar of a length adapting it to be applied in spanning relation to spaced objects, a level applicable to a straight edge face of said bar and having notches at its ends, and means for detachably securing the level to the bar consisting of a block adapted to be disposed against a side edge face of the bar opposite the level, wings carried by said block for overlapping opposed side faces of the bar, ends of the block being extended beyond ends of the wings and formed with openings, plungers slidable through the openings of the block, springs about said plungers bearing against the block for holding the plungers against the edge face of the bar and urging the block away from the bar, pins projecting from opposite sides of the block, and yokes carried by said pins for engaging about the bar and through the notches of the level for holding the level in tight engagement with the bar.

3. A straight edged bar of a length adapting it to be applied in spanning relation to spaced objects, a level applicable to the bar in a position longitudinally thereof, said level having notches formed adjacent its ends, and means for detachably holding the level in its operative relation to the bar including looped members adapted to straddle the bar and the level and engage through the notches of the level.

4. A straight edged bar of a length adapting it to be applied in spanning relation to spaced objects, a level applicable to the bar in a position longitudinally thereof, said level having notches formed adjacent its ends, and means for detachably holding the level in its operative relation to the bar consisting of a support to engage under the bar and the level and having an upstanding abutment to engage back of the bar, abutments rising from the support to engage the bar in front thereof, hangers disposed vertically with their upper ends hooked over the bar and their lower ends passed through the support and carrying adjustable fasteners to clamp the support tightly against the lower edge face of the bar, and resilient clips carried by the support and overlying the support for engaging in the notches of the level and holding the level firmly upon the support.

5. A straight edged bar, a level extending longitudinally of said bar against a side edge face thereof, and means for detachably holding said level in operative relation to said bar including a member for engaging the bar at the opposite side thereof from the level, and securing members carried by the first member for engaging across portions of said level and securely but releasably holding the level in place.

6. A straight edged bar, a level extending longitudinally of said bar and having a base portion for engaging a side edge face of the bar and a body adjustably carried by the base portion, and means for supporting said level in operative relation to the straight edged bar including a member for engaging the edge face of the bar at the opposite side thereof from the level, securing members carried by said member for engaging across said base portion and securely but releasably holding the level in place, and means for urging the first member away from the bar and exerting pull upon the securing members.

JOHN E. TORBERT, Jr.